US012771205B2

(12) United States Patent
Lee et al.

(10) Patent No.: US 12,771,205 B2
(45) Date of Patent: Oct. 20, 2026

(54) MOTOR AND CONTROL DEVICE

(71) Applicant: LG INNOTEK CO., LTD., Seoul (KR)

(72) Inventors: Seung Hyeong Lee, Seoul (KR); Jae Bin An, Seoul (KR); Kun Yong Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 151 days.

(21) Appl. No.: 18/681,744

(22) PCT Filed: Jul. 5, 2022

(86) PCT No.: PCT/KR2022/009653

§ 371 (c)(1),
(2) Date: Feb. 6, 2024

(87) PCT Pub. No.: WO2023/013897

PCT Pub. Date: Feb. 9, 2023

(65) Prior Publication Data

US 2024/0275230 A1 Aug. 15, 2024

(30) Foreign Application Priority Data

Aug. 6, 2021 (KR) ........................ 10-2021-0103957
Oct. 14, 2021 (KR) ........................ 10-2021-0136954

(51) Int. Cl.
*H02K 11/30* (2016.01)
*H02K 5/22* (2006.01)
(Continued)

(52) U.S. Cl.
CPC ............. *H02K 5/225* (2013.01); *H02K 11/30* (2016.01); *H02K 11/33* (2016.01); *H02K 3/522* (2013.01);
(Continued)

(58) Field of Classification Search
CPC ........ H02K 11/30; H02K 11/33; H02K 5/225; H02K 3/522; H02K 2203/09;
(Continued)

(56) References Cited

U.S. PATENT DOCUMENTS

2016/0020658 A1 1/2016 Tamura
2017/0310183 A1* 10/2017 Jang ......................... H02K 5/22
2021/0320548 A1* 10/2021 Shimodaira ............ H02K 3/522

FOREIGN PATENT DOCUMENTS

CN 104021932 A 9/2014
CN 105322747 A 2/2016
(Continued)

OTHER PUBLICATIONS

Supplementary European Search Report dated Oct. 17, 2024 in European Application No. 22853276.8.
(Continued)

*Primary Examiner* — Alexander A Singh
(74) *Attorney, Agent, or Firm* — SALIWANCHIK, LLOYD & EISENSCHENK

(57) ABSTRACT

A motor comprises: a body; a busbar coupled to the body; and a heat transfer member disposed on the body, wherein the body includes a first open area for exposing the busbar in the axial direction, and a second open area, the second open area includes a first unit open area and a second unit open area, and the heat transfer member is in contact with the busbar in the first open area and is disposed between the first unit open area and the second unit open area.

20 Claims, 14 Drawing Sheets

(51) Int. Cl.
*H02K 11/33* (2016.01)
*H02K 3/52* (2006.01)

(52) U.S. Cl.
CPC ...... *H02K 2203/09* (2013.01); *H02K 2211/03* (2013.01)

(58) Field of Classification Search
CPC .. H02K 2211/03; H05K 1/0206; H05K 1/181; H05K 2201/10946; H05K 2201/0999; H05K 2201/10545
USPC .................................................. 310/71, 68 R
See application file for complete search history.

(56) References Cited

FOREIGN PATENT DOCUMENTS

| | | | |
|---|---|---|---|
| CN | 207353943 | U | 5/2018 |
| CN | 109983672 | A | 7/2019 |
| CN | 111434195 | A | 7/2020 |
| CN | 112640270 | A | 4/2021 |
| EP | 2 824 765 | A1 | 1/2015 |
| JP | 2004-215358 | A | 7/2004 |
| JP | 2005-191435 | A | 7/2005 |
| JP | 2009-131054 | A | 6/2009 |
| JP | 2012-9828 | A | 1/2012 |
| JP | 2021-61745 | A | 4/2021 |
| JP | 2021-106442 | A | 7/2021 |
| KR | 10-2017-0055731 | A | 5/2017 |
| KR | 10-2021-0090003 | A | 7/2021 |
| WO | 2020/183693 | A1 | 9/2020 |
| WO | 2020/241026 | A1 | 12/2020 |
| WO | 2021/124669 | A1 | 6/2021 |

OTHER PUBLICATIONS

International Search Report dated Oct. 21, 2022 in International Application No. PCT/KR2022/009653.

Office Action dated May 13, 2026 in Chinese Application No. 202280055162.8.

Office Action dated Aug. 13, 2026 in Korean Application No. 10-2021-0103957.

* cited by examiner

| Temperature [°C] | Point 1 | Point 2 | Point 3 |
|---|---|---|---|
| (a) | 127.82 | 128.22 | 129.43 |
| (b) | 124.89 | 125.47 | 126.48 |
| Difference | 2.93 | 2.75 | 2.95 |

MOTOR AND CONTROL DEVICE

CROSS-REFERENCE TO RELATED APPLICATIONS

This application is the U.S. national stage application of International Patent Application No. PCT/KR2022/009653, filed Jul. 5, 2022, which claims the benefit under 35 U.S.C. § 119 of Korean Application Nos. 10-2021-0103957, filed Aug. 6, 2021; and 10-2021-0136954, filed Oct. 14, 2021; the disclosures of each of which are incorporated herein by reference in their entirety.

TECHNICAL FIELD

The present embodiment relates to a motor and a control device.

BACKGROUND ART

The motor includes a housing, a stator being disposed inside the housing, and a rotor being disposed inside the stator, and is a device that generates rotational motion by electromagnetic interaction between the stator and the rotor. Specifically, a coil is wound on the stator, and a magnet facing the coil is disposed on the rotor, so that the rotor can rotate by the action of the coil and magnet.

In general, motors being used in vehicles often connect multiple coils in parallel to reduce losses due to coil resistance. Therefore, when connecting in parallel, a method in which coils are extended up to an input/output terminal and comprehensively connected at the terminal is used.

Therefore, a busbar module is disposed on an upper side of a stator to connect the coils disposed in parallel. The busbar module is disposed to correspond to an upper surface of a stator and may include a busbar for connection to the coil terminal. To implement a three-phase circuit, the busbar includes a plurality of busbars with different polarities.

During the driving process of the motor, the components within the motor, including the busbar, generate heat, but according to the motor according to the prior art, there is no separate heat dissipation structure within the motor, so there is a risk of deformation of the housing or malfunction of the electrical components.

DETAILED DESCRIPTION OF THE INVENTION

Technical Subject

The present embodiment is intended to provide a motor that can enhance heat dissipation efficiency by improving the structure.

In addition, it is intended to provide a control device that can improve heat dissipation efficiency by improving the structure.

Technical Solution

A motor according to an embodiment comprises: a body; a busbar being coupled to the body; and a heat transfer member being disposed on the body, wherein the body includes a first open area for exposing the busbar in an axial direction, and a second open area, the second open area includes a first unit open area and a second unit open area, and the heat transfer member is in contact with the busbar in the first open area and is disposed between the first unit open area and the second unit open area.

The heat transfer member may be formed of a material different from the body.

A side wall may be disposed between the first open area and the second open area.

The length of the side wall forming the inner surface of the first open area in a radial direction may be greater than the length of the side wall in a radial direction forming the inner surface of the second open area.

The length of the first open area in a circumferential direction may be smaller than the length of the second open area in a circumferential direction.

The busbar includes a busbar body being extended in a circumferential direction and a protrusion extended in a radial direction from the busbar body, wherein at least a portion of the busbar body is disposed in the first open area, and wherein at least a portion of the protrusion may be disposed in the second open area.

The cross-sectional shape of the heat transfer member may correspond to the cross-sectional shape of the first open area.

The second body may include a groove that opens the busbar upward.

The busbar includes a first busbar of a first polarity, a second busbar of a second polarity different from the first polarity, and a third busbar of a third polarity different from the first polarity and the second polarity, wherein the first to third busbars may be disposed to be spaced apart from each other along a radial direction.

A control device according to an embodiment of the present invention comprises: a printed circuit board including a plurality of holes; a plurality of electronic components being disposed on the plurality of holes on one side of the printed circuit board; and a terminal being disposed on the other side of the printed circuit board, wherein the printed circuit board includes a first path electrically connecting at least a apart among the plurality of electronic components, and wherein the terminal may include a second path being connected to the plurality of holes and electrically connecting at least a part among the plurality of electronic components.

Advantageous Effects

Since the busbar is exposed above the body through a plurality of open areas through the present embodiment, there is an advantage that heat dissipation efficiency is enhanced as the heat dissipation area increases.

In addition, since the busbar has a structure in which heat is directly dissipated through the heat transfer member, there is an advantage that heat can be easily discharged to the outside along the predetermined path.

In addition, by forming an additional connection path between the pluralities of electronic components through the terminal, there is an advantage of reducing the amount of heat generated by the printed circuit board due to a reduction in the resistance component of the electrical connection section.

In addition, since the heat of the electronic component is directly transferred to the terminal, filler, and cover through the metal material filled in the hole, there is an advantage in that the heat dissipation area can be increased and heat dissipation efficiency can be enhanced.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or disposed in "on (above)" or "below (under)" of each component, "on (above)" or "below (under)" means that it includes not only the case where the two components are directly in contact with, but also the case where one or more other components are formed or disposed between the two components. In addition, when expressed as "on (above)" or "below (under)", the meaning of not only an upward direction but also a downward direction With respect to one component may be included.

Hereinafter, the present invention will be described in more detail with reference to the attached drawings.

Figure 1:
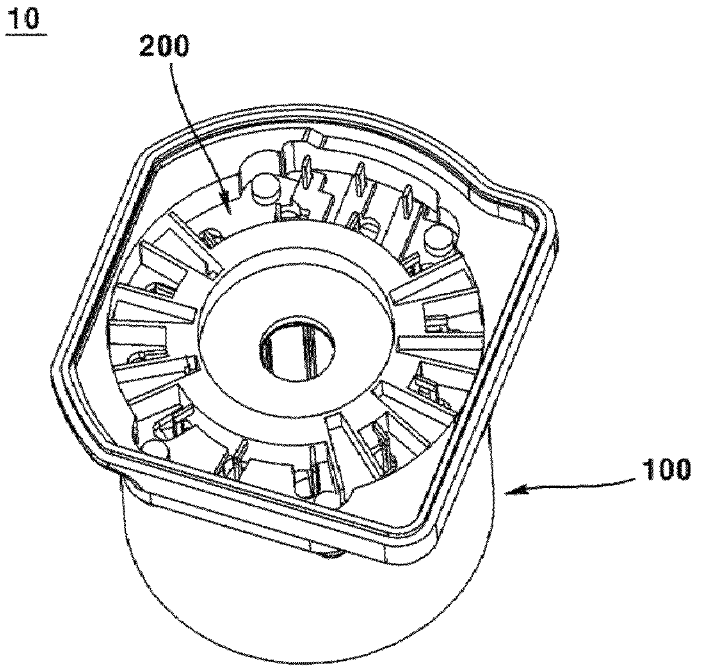
FIG. 1 is a perspective view illustrating the outer appearance of a motor according to an embodiment of the present invention.
Figure 2:
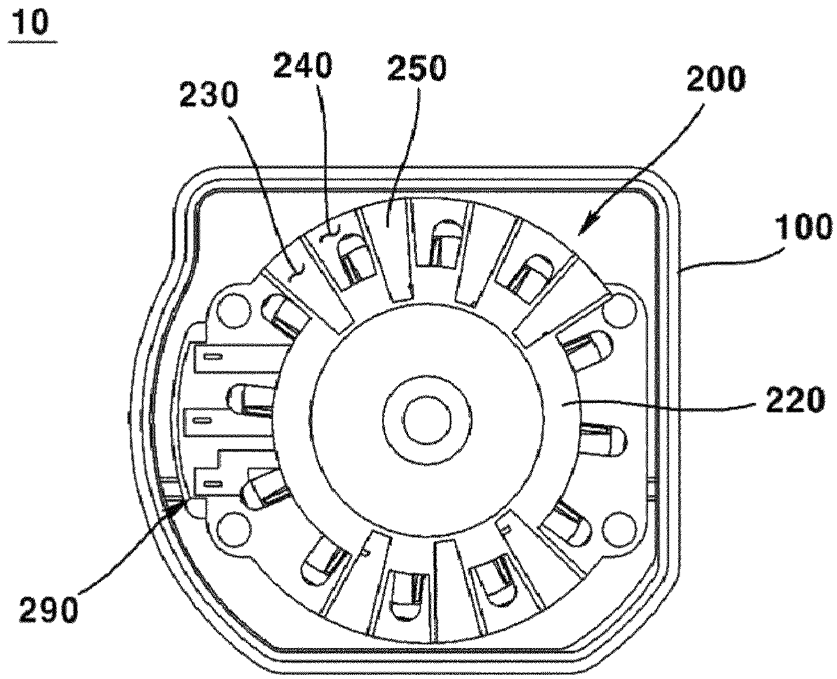
FIG. 2 is a plan view illustrating an upper surface of a motor according to an embodiment of the present invention.
Figure 3:
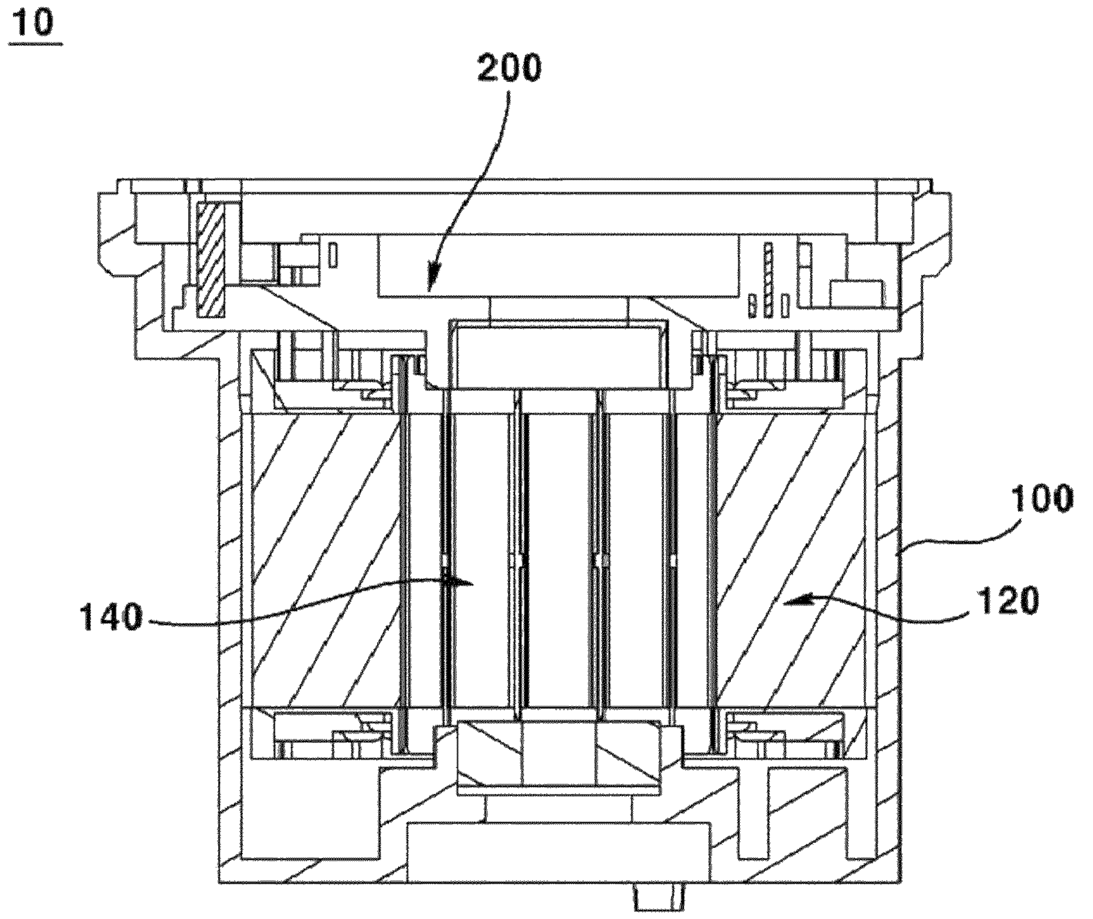
FIG. 3 is a cross-sectional view illustrating the configuration inside a motor according to an embodiment of the present invention.
Figure 4:
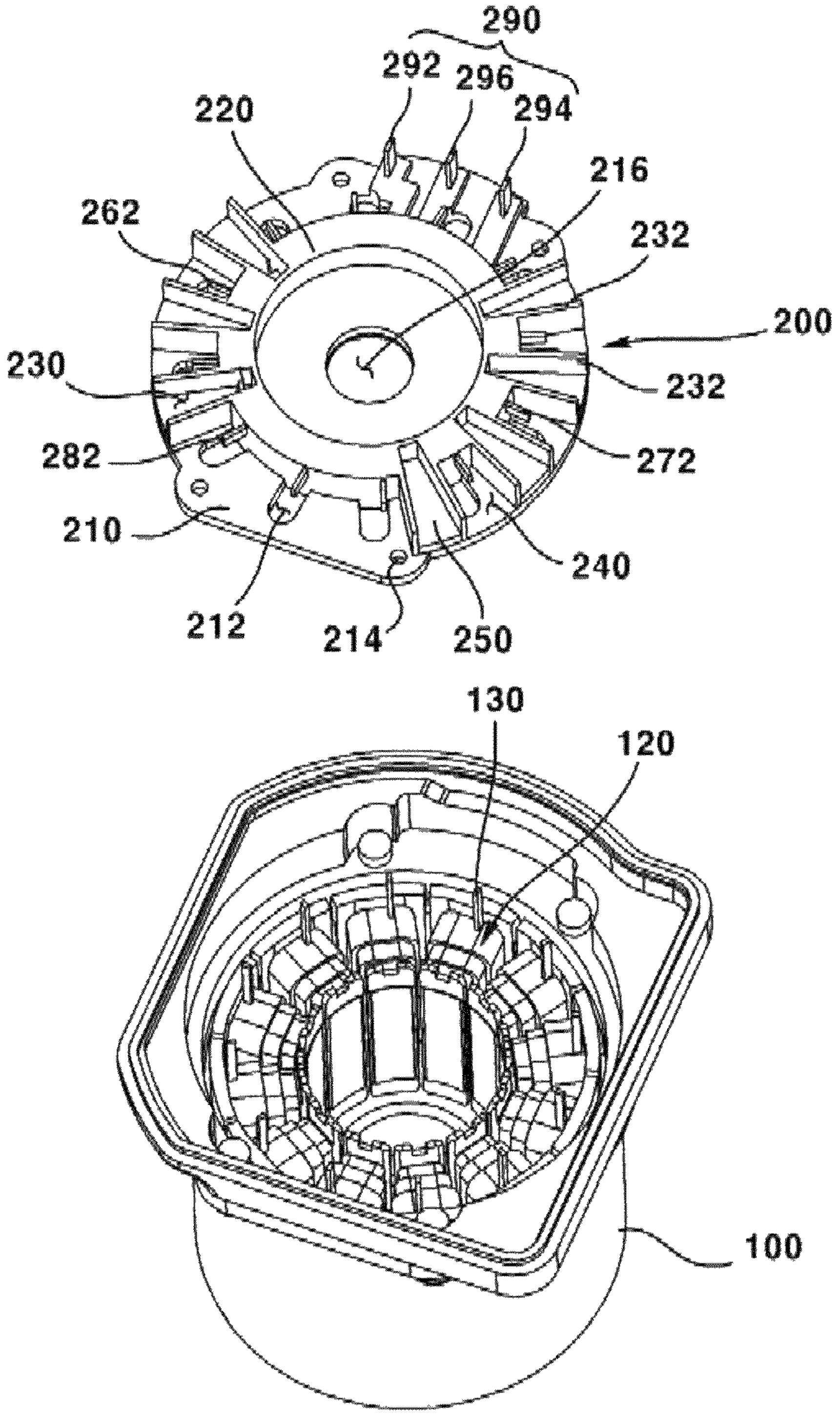
FIG. 4 is an exploded perspective view of the housing and a busbar module according to an embodiment of the present invention.
Figure 5:
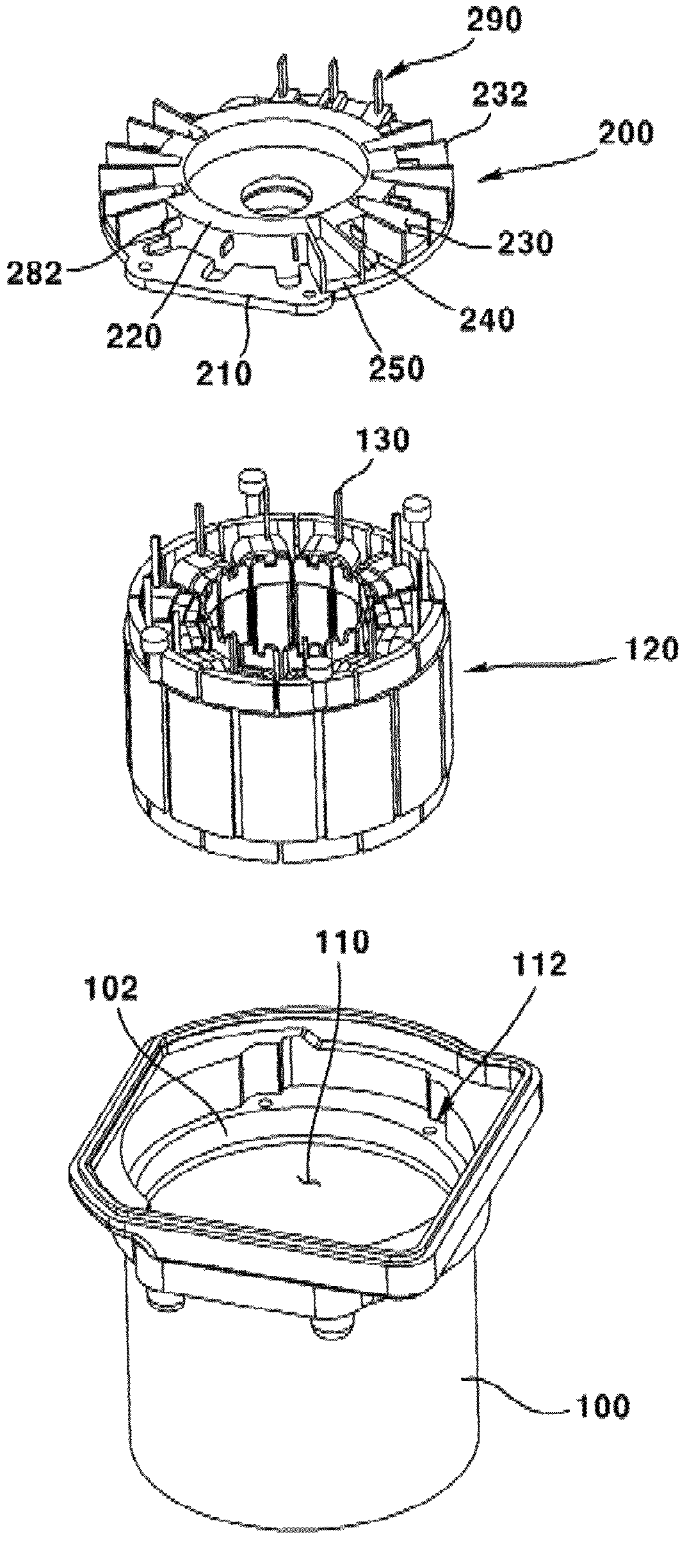
FIG. 5 is an exploded perspective view of a housing, a stator, and a busbar module according to an embodiment of the present invention.
Figure 6:
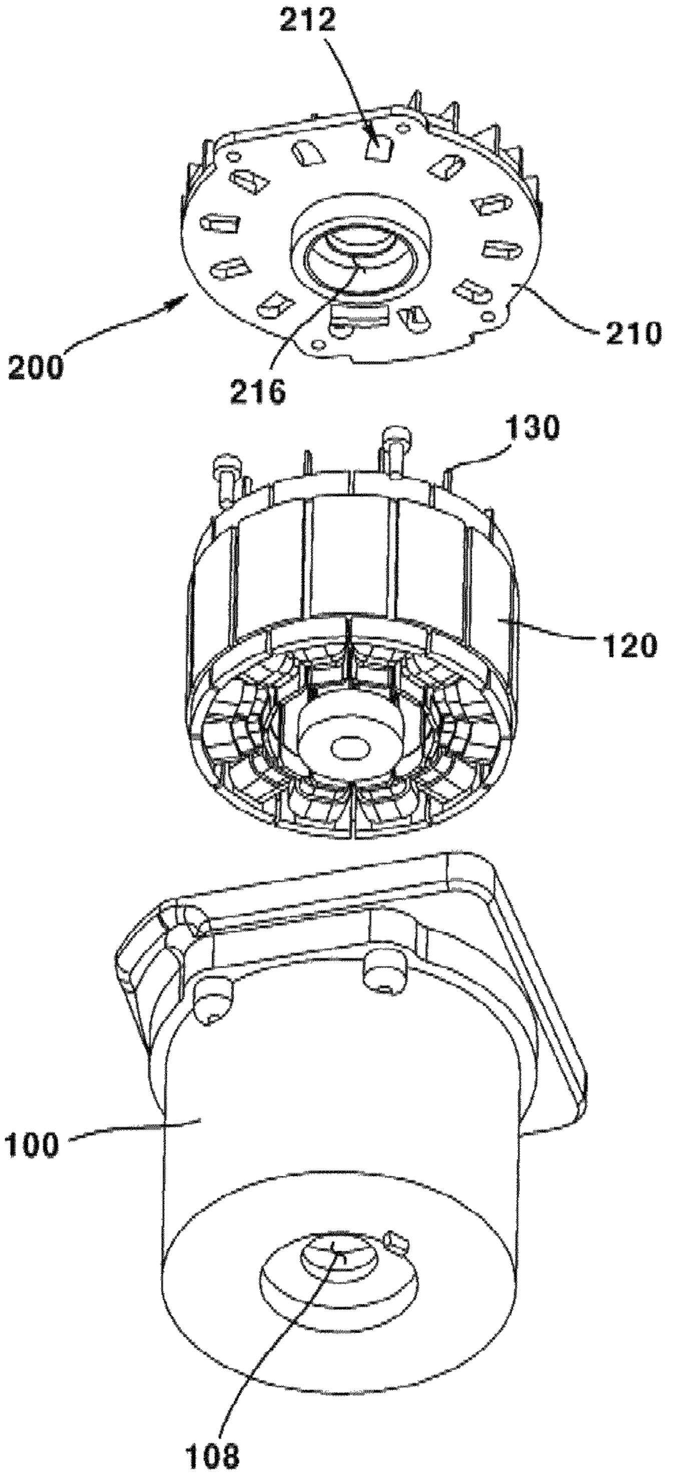
FIG. 6 is a view illustrating FIG. 5 from another angle.
Figure 7:
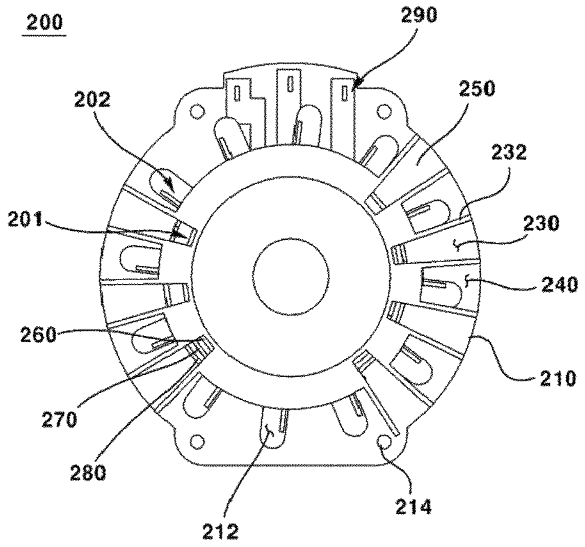
FIG. 7 is a plan view illustrating an upper surface of a busbar module according to an embodiment of the present invention.
Figure 8:
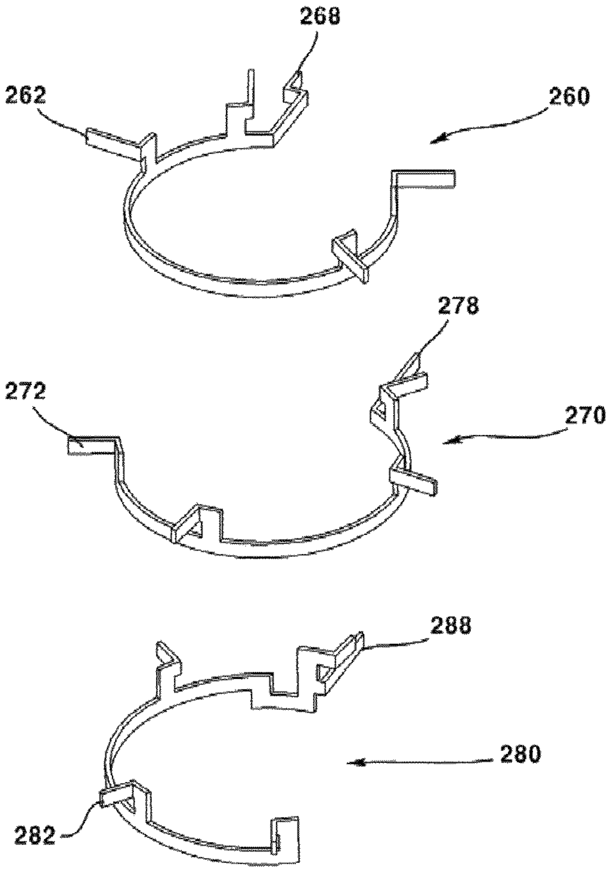
FIG. 8 is an exploded perspective view of a plurality of busbars according to an embodiment of the present invention.
Figure 9:
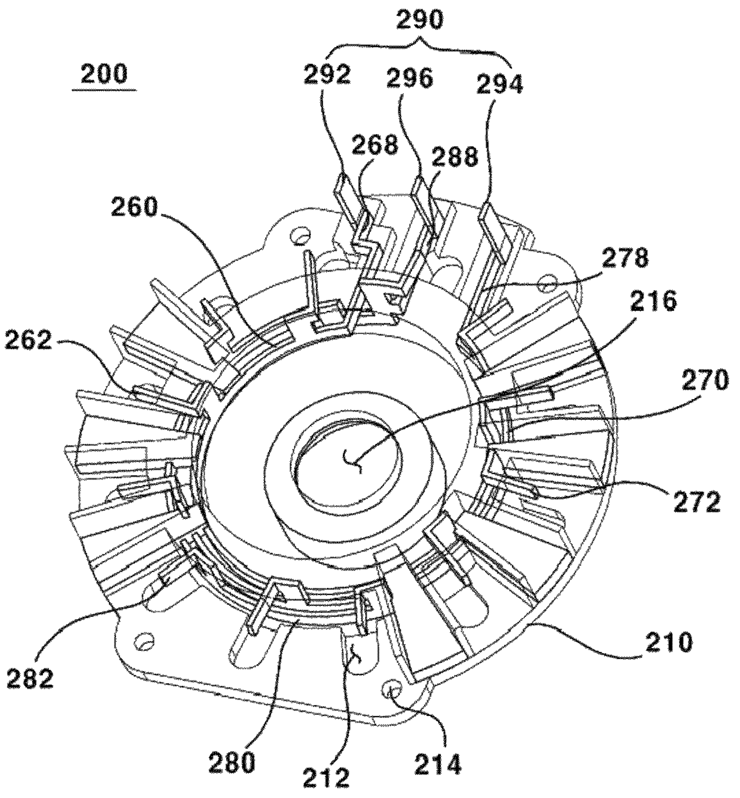
FIG. 9 is a diagram for explaining the arrangement structure of a busbar in a busbar module according to an embodiment of the present invention.

FIG. 1 is a perspective view illustrating the outer appearance of a motor according to an embodiment of the present invention; FIG. 2 is a plan view illustrating an upper surface of a motor according to an embodiment of the present invention; FIG. 3 is a cross-sectional view illustrating the configuration inside a motor according to an embodiment of the present invention; FIG. 4 is an exploded perspective view of the housing and a busbar module according to an embodiment of the present invention; FIG. 5 is an exploded perspective view of a housing, a stator, and a busbar module according to an embodiment of the present invention; FIG. 6 is a view illustrating FIG. 5 from another angle; FIG. 7 is a plan view illustrating an upper surface of a busbar module according to an embodiment of the present invention; FIG. 8 is an exploded perspective view of a plurality of busbars according to an embodiment of the present invention; and FIG. 9 is a diagram for explaining the arrangement structure of a busbar in a busbar module according to an embodiment of the present invention.

Referring to FIGS. 1 to 9, the motor 10 according to an embodiment of the present invention may comprise a housing 100, a stator 120, a rotor 140, and a busbar module 200.

The housing 100 forms the outer appearance of the motor 10 and may include a space 102 inside which the stator 120, the rotor 140, and the busbar module 200 are disposed.

The space 102 may be partitioned into a first area where the stator 120 and the rotor 140 are disposed and a second area where the busbar module 200 is disposed. The first area and the second area may be partitioned by the step 110 as a boundary. The step 110 has a shape being protruded more inward than other areas from the inner surface of the housing 100, wherein the first area is disposed at a lower portion of the step 110, and the second area may be disposed at an upper portion of the step 110. The cross-sectional area of the first area may be formed to be smaller than the cross-sectional area of the second area.

A screw hole 112 may be formed on the upper surface of the step 110 so that the busbar module 200 can be screw-coupled thereto.

The stator 120 may be disposed inside the housing 100. The stator 120 may include a stator core, an insulator surrounding an outer surface of the stator core, and a coil 130 wound around the insulator. Both ends of the coil 130 may be extended upward from the stator core and coupled to the busbar module 200.

The coil 130 may comprise a first coil having a first polarity, a second coil having a second polarity different from the first polarity, and a third coil having a third polarity different from the first polarity and the second polarity.

The rotor 140 may be disposed inside the stator 120. The rotor 140 may include a rotor core and a magnet being disposed on the outer surface of the rotor core. The magnet may be disposed to face the coil 130. Therefore, the rotor 140 can rotate due to electromagnetic interaction between the magnet and the coil 130.

The shaft is coupled to the center of the rotor 140 and can rotate together with the rotor 140. Both ends of the shaft may be extended upward and downward, respectively, of the housing 100; one end of the shaft protrudes downward through an opening 108 (refer to FIG. 6) formed on the lower surface of the housing 100; and the upper end of the shaft may be protruded upward through the opening 216 (refer to FIG. 4) formed in the center of the bus module 200.

At least one bearing may be disposed inside the housing 100 to support rotation of the shaft.

The busbar module 200 may be disposed at an upper portion of the stator 120. The busbar module 200 may be disposed in the second area. The busbar module 200 may be coupled to the upper surface of the step 110.

The busbar module 200 electrically connects the coil 130 and a controller (not shown), and thus the output of the motor 10 can be controlled through the controller. The controller may be disposed at an upper portion of the busbar module 200.

The busbar module 200 may include a body, a busbar, a terminal 290, and a heat transfer member 250.

The body may form the outer appearance of the busbar module 200. The body may form the body part of the busbar module 200. The body may have a circular cross-sectional shape. The body may include two or more step areas having different heights.

In detail, the body may include a plate-shaped first body 210 and a second body 220 being protruded upward from the upper surface of the first body 210 and has a ring-shaped cross section. An opening 216 penetrating from the upper surface to the lower surface may be formed in the center of the body, and the shaft may be protruded upward through the opening 216.

The first body 210 may include a hole 212 penetrating from the upper surface to the lower surface. The hole 212 may be formed to correspond to the arrangement area of the protrusions 262, 272, and 282 of the busbar, which will be described later. The hole 212 may be disposed in an area being overlapped with the protrusions 262, 272, and 282 of the busbar in an up and down direction. The end portion of the coil 130 penetrates through the hole 212 and is disposed at an upper portion of the first body 210 to be electrically connected to the busbar. The end of the coil 130 may be coupled to the protrusions 262, 272, and 282 of the busbar by fusing.

The first body 210 may include a coupling hole 214 penetrating from the upper surface to the lower surface, and a screw penetrates the coupling hole 214 and can be screw-coupled to the upper surface of the step 110 of the housing 100.

The second body 220 is disposed on the first body 210, and the cross-sectional area of the second body 220 may be smaller than the cross-sectional area of the first body 210. With respect to the second body 220, the first body 210 may be partitioned into a plurality of areas being spaced apart in the radial direction. For example, the central area of the first body 210 is disposed inside the second body 220, and an edge area of the first body 210 may be disposed outside the second body 220. At least a portion of the busbar may be disposed inside the second body 220. A hole through which the busbar passes may be formed on the outer surface of the second body 220.

At least a portion of the busbar may be disposed inside the second body 220, and another portion may be protruded outward through a hole of the second body 220. As illustrated in FIG. 8, the busbar may include a busbar body being extended in a circumferential direction, and protrusions 262, 272, and 282 being extended in a radial direction from the busbar body, and the busbar body is disposed inside the second body 220, and at least a portion of the protrusions 262, 272, and 282 may be disposed outside the second body 220.

The busbar body may have an arc shape with both ends spaced apart, as illustrated in FIG. 8. The protrusions 262, 272, and 282 may be provided in plural numbers and disposed to be spaced apart from each other along the circumferential direction of the busbar body.

The busbars may be provided in plural numbers. The plurality of busbars may comprise: a first busbar 260 being connected to the first coil; a second busbar 270 being connected to the second coil; and a third busbar 280 being connected to the third coil. At least a portion of the first to third busbars 260, 270, and 280 may be disposed to be overlapped along the radial direction. A second busbar 270 may be disposed outside the first busbar 260, and a third busbar 280 may be disposed outside the second busbar 270. To inhibit electrical short circuits from occurring, an insulating member made of an insulating material may be disposed between the first busbar 260 and the second busbar 270, and between the second busbar 270 and the third busbar 280. The first to third busbars 260, 270, and 280 may be spaced apart in the radial direction through the insulating member.

Meanwhile, a first protrusion 262 being disposed in the first busbar 260, a second protrusion 272 being disposed in the second busbar 270, and a third protrusion 282 being disposed in the third busbar 270 may be disposed to form the same height, but unlike this, may be disposed to form a step in an up and down direction. As an example, the height of the first protrusion 262 being disposed in the first unit open area, which will be described later, may be disposed higher than the height of the second protrusion 272 being disposed in the second unit open area.

The busbar may include connection portions 268, 278, and 288. The connection portions 268, 278, and 288 are for connection to the terminal 290 and may have a shape being extended outward from one end of the busbar body. An electrical connection can be made between the controller and the busbar through the terminal 290. The terminal 290 may have a shape being protruded upward from the first body 210. The terminal 290 may include: a first terminal 292 being electrically connected to the first busbar 260; a second terminal 294 being electrically connected to the second busbar 270; and a third terminal 296 being electrically connected to the third busbar 280.

Meanwhile, the first body 210 and the second body 220 may be formed of an insulating material. For example, the first body 210 and the second body 220 may be made of plastic.

The busbar may include a first area 201 and a second area 202. The first area 201 and the second area 202 may be exposed to the outside of the body in an axial direction. The first area 201 may be a portion of the busbar body. The second area 202 may be a portion of the protrusions 262, 272, and 282. With respect to the circumferential direction, the first area 201 and the second area 202 may be disposed so as not to be overlapped with each other. With respect to the radial direction, the first area 201 and the second area 202 may be disposed so as not to be overlapped with each other.

The busbar module 200 may include a first open area 230 and a second open area 240. The first open area 230 and the second open area 240 may each be provided in plural numbers and disposed alternately along the circumferential direction. When viewed from the upper portion, the first open area 230 and the second open area 240 may have a groove shape that is recessed lower than the other areas. A side wall 232 is disposed between the first open area 230 and the second open area 240, and the first open area 230 and the second open area 240 may be partitioned from each other through the side wall 232.

Since the first open area 230 and the second open area 240 are disposed alternately along the circumferential direction, when the second open area includes a first unit open area and a second unit open area being spaced apart in the circumferential direction, the first open area 230 may be disposed between the first unit open area and the second unit open area.

The hole 212 and the protrusions 262, 272, and 282 may be disposed in the second open area 240. Accordingly, the protrusions 262, 272, and 282 may be exposed upward through the second open area 240.

The first area of the busbar may be disposed in the first open area 230. To this end, the radial length of the first open area 230 may be formed to be longer than the radial length of the second open area 240. At least a portion of the first open area 230 may be disposed to be overlapped with the second body 220 in the circumferential direction. In this case, the second body 220 may include a groove area that opens the busbar body upward. The second open area 240 may be disposed outside the second body 220 in the radial direction. The radial length of the side wall forming the inner circumferential surface of the first open area 230 may be formed to be longer than the radial length of the side wall forming the inner circumferential surface of the second open area 240. The circumferential length of the first open area 230 may be smaller than the circumferential length of the second open area 240.

The heat transfer member 250 may be disposed in the first open area 230. The heat transfer member 250 may be disposed on the bottom surface of the first open area 230. The cross-sectional shape of the heat transfer member 250 may be formed to correspond to the cross-sectional shape of the first open area 230. The heat transfer member 250 may have a predetermined thickness. The heat transfer member 250 is made of a material with excellent thermal conductivity that is different from the material of the body, and may be in contact with the busbar. The heat transfer member 250 may be in contact with the first area of the busbar. The heat transfer member 250 may be in contact with the lower surface of the first area. Accordingly, the heat of the busbar is transmitted outward in the radial direction through the heat transfer member 250, and heat dissipation can be accomplished through the remaining area of the heat transfer member 250 being exposed upward.

Meanwhile, in the present embodiment, the heat transfer member 250 is disposed only in the first open area 230 as an example, but this is not limited to this, and the heat transfer member 250 may also be disposed in the second open area 240. In addition, the heat transfer member 250 may be provided in the first open area 230 by applying and curing a liquid heat dissipation material to the first open area 230, but unlike this, the solid heat transfer member 250 may be directly coupled to the first open area 230, and in this case, the side wall 232 may be omitted from the body.

According to the above structure, since the busbar is exposed above the body through a plurality of open areas, there is an advantage in that heat dissipation efficiency is enhanced due to an increase in heat dissipation area.

In addition, since the busbar has a structure in which heat is directly dissipated through the heat transfer member, there is an advantage that heat can be easily discharged to the outside along the predetermined path.

Figure 10:
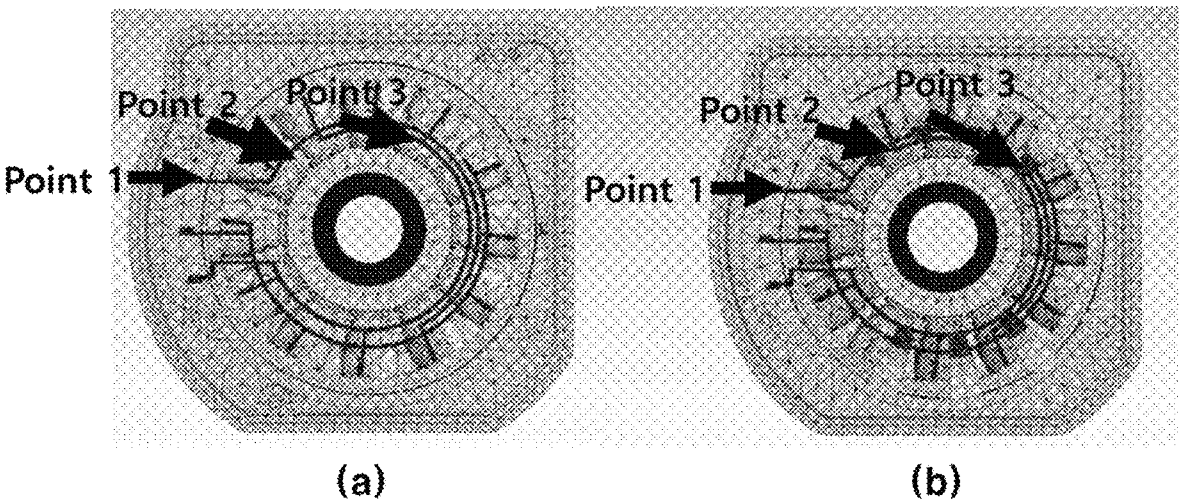
FIG. 10 is a diagram for explaining heat dissipation efficiency between a busbar module according to the prior art and a busbar module according to an embodiment of the present invention.

FIG. 10 is a diagram for explaining heat dissipation efficiency between a busbar module according to the prior art and a busbar module according to an embodiment of the present invention.

Referring to FIG. 10, as a result of measuring the temperature of a busbar module according to the prior art (refer to FIG. 10(*a*)) and three arbitrarily designated areas within the busbar module (FIG. 10(*b*)) according to an embodiment of the present invention, it can be seen that the busbar module 200 according to an embodiment of the present invention has a temperature reduction effect of about 30° C. compared to the busbar module according to the prior art.

Figure 11:
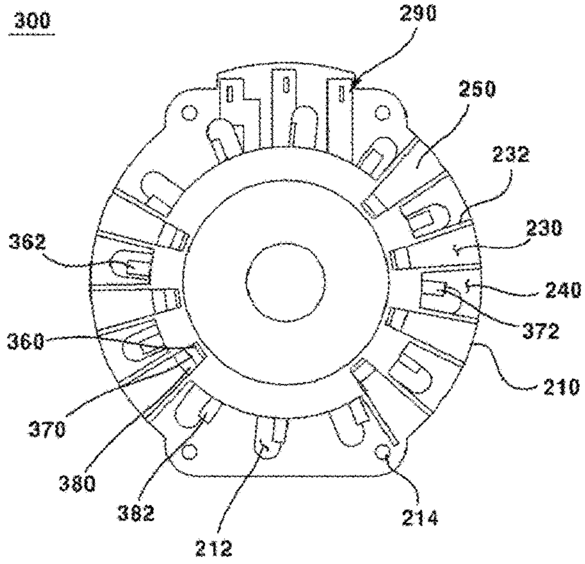
FIGS. 11 and 12 are diagrams illustrating a modified embodiment of a busbar module according to an embodiment of the present invention.
Figure 12:
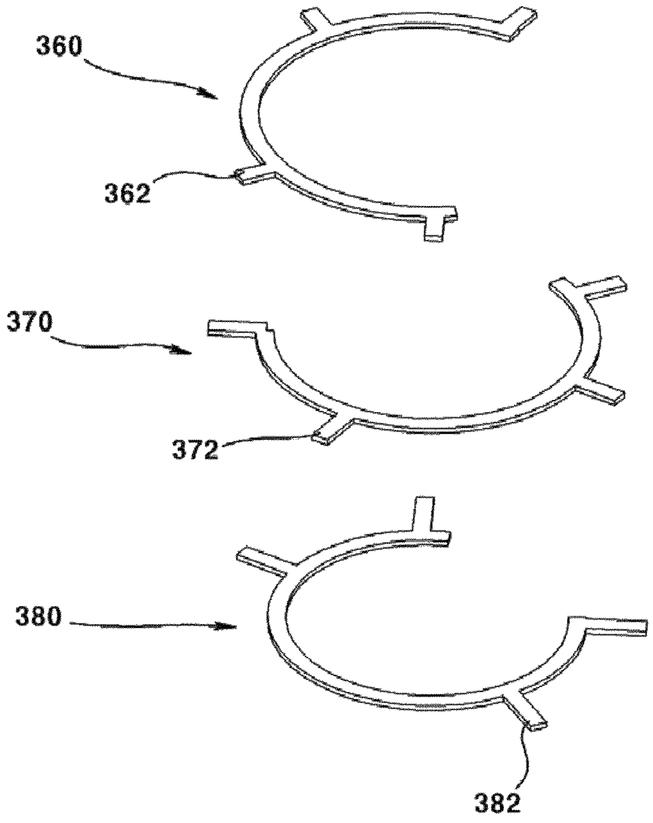

FIGS. 11 and 12 are diagrams illustrating a modified embodiment of a busbar module according to an embodiment of the present invention.

In the present modified embodiment, other parts are the same as the busbar module described above, but there are differences depending on the shape of the busbar.

Referring to FIGS. 11 and 12, in the present modified embodiment, the busbar may include first to third busbars 360, 370, and 380. The first to third busbars 360, 370, and 380 may each include a busbar body and protrusions 362, 372, and 382 being protruded radially outward from the busbar body, but the shape of the busbar body may have a plate shape.

More specifically, in an embodiment previously described, the area of the upper and lower surfaces of the busbar body and protrusion 262, 272, and 282 has a shape that is smaller than the area of the side surface, but in the present modified embodiment, the area of the upper and lower surfaces of the busbar body and the protrusions 362, 372, and 382 may have a plate shape larger than the area of the side surface. In this case, the busbar bodies of each of the first to third busbars 360, 370, and 380 may be disposed to form the same height and disposed along the radial direction, or may be disposed to have a step to form different heights.

Hereinafter, a control device according to an embodiment of the present invention will be described.

Figure 13:
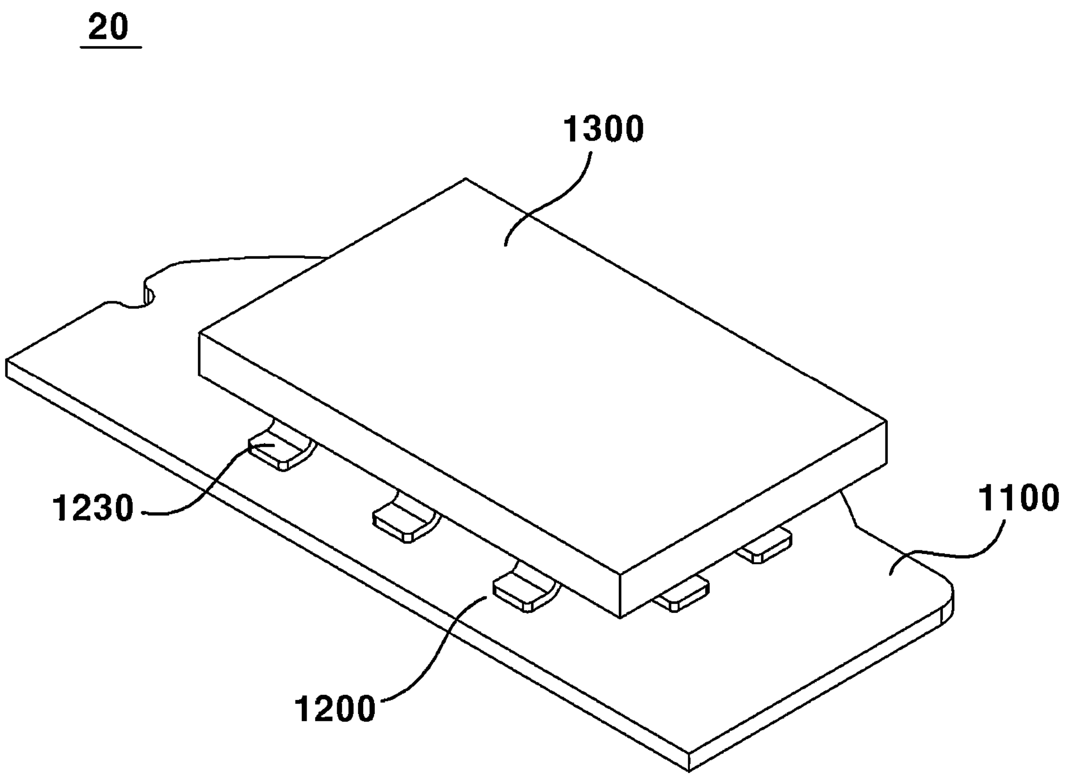
FIG. 13 is a perspective view of a control device according to an embodiment of the present invention.
Figure 14:
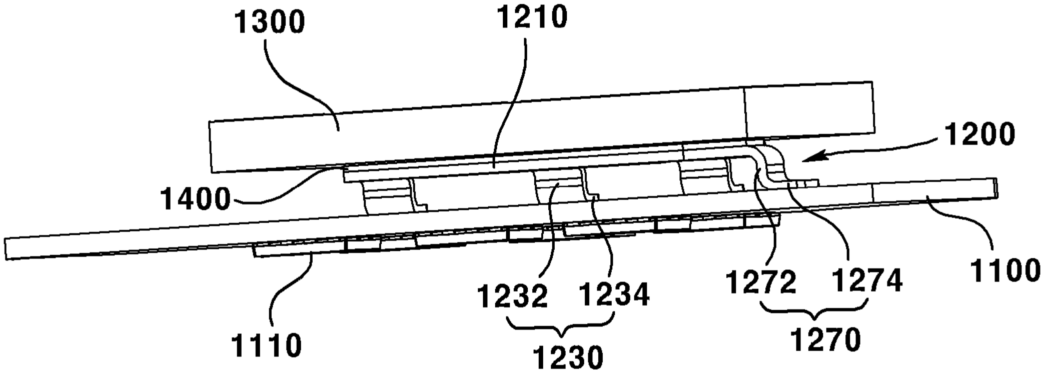
FIG. 14 is a perspective view illustrating a side surface of a heat dissipation structure in a control device according to an embodiment of the present invention.
Figure 15:
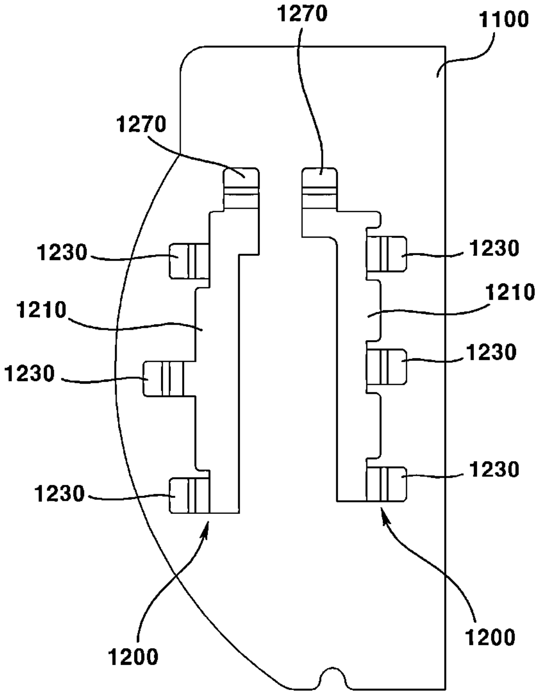
FIG. 15 is a plan view illustrating a terminal coupled to a printed circuit board according to an embodiment of the present invention.
Figure 16:
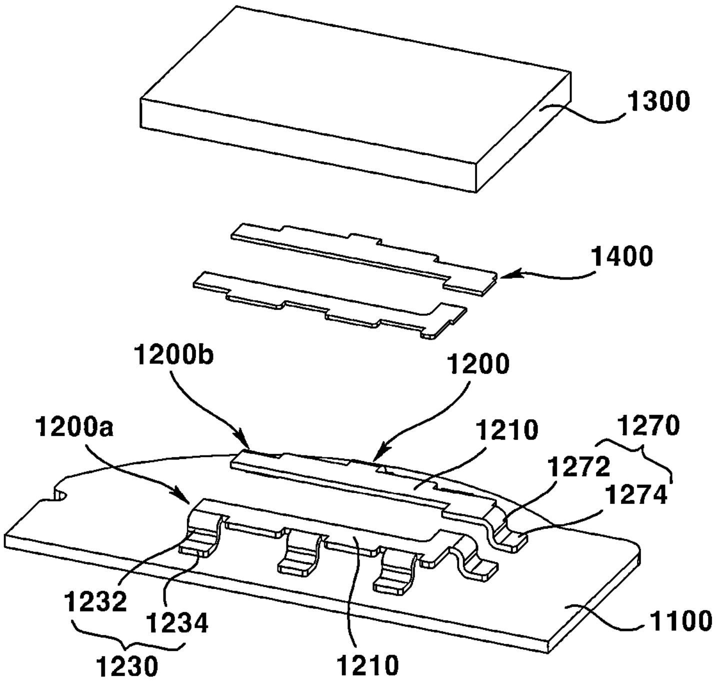
FIG. 16 is an exploded perspective view of a heat dissipation structure in a control device according to an embodiment of the present invention.
Figure 17:
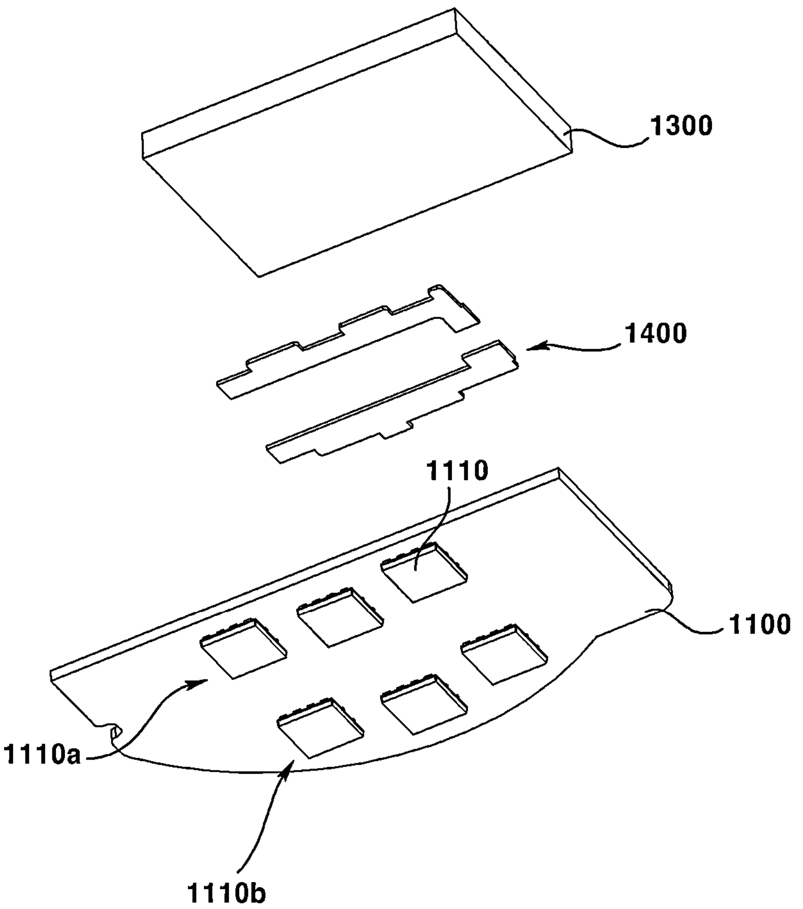
FIG. 17 is a view illustrating FIG. 16 from another angle.
Figure 18:
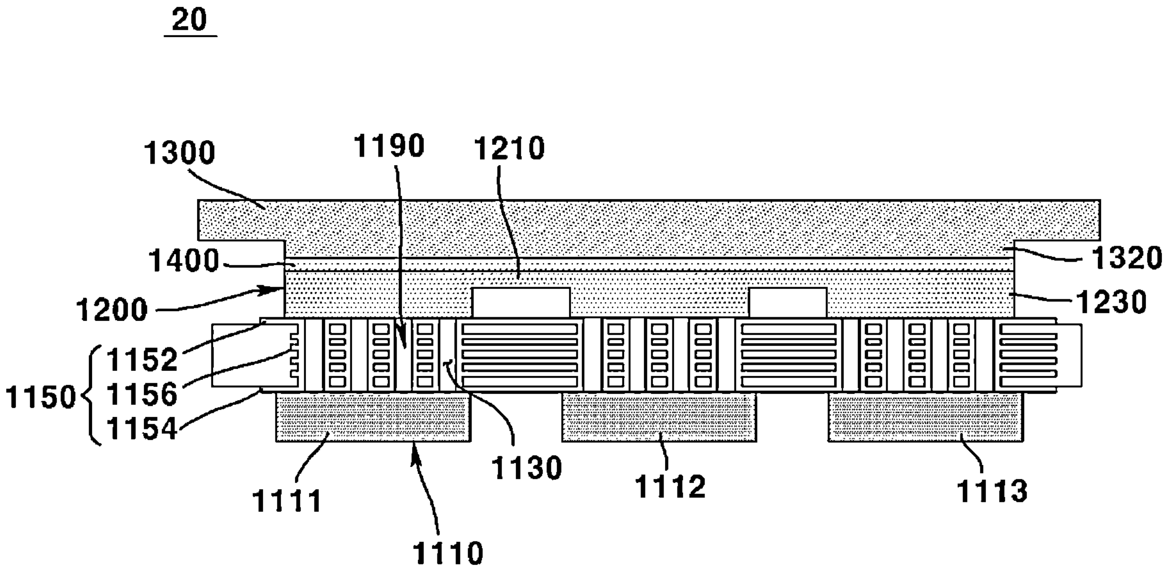
FIG. 18 is a cross-sectional view of a control device according to an embodiment of the present invention.
Figure 19:
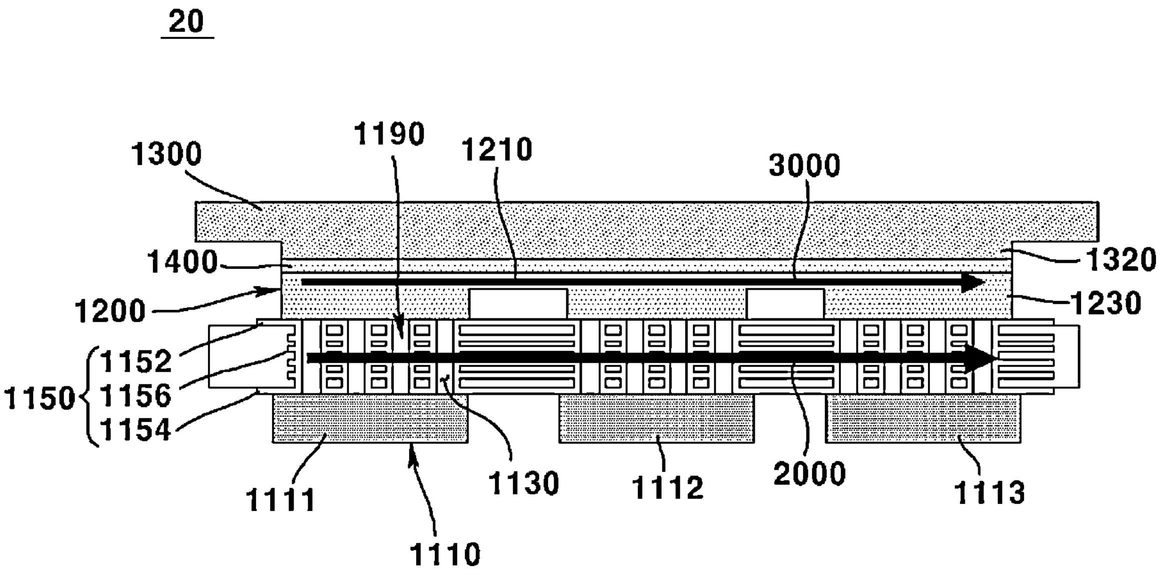
FIG. 19 is a diagram for explaining the connection structure of electronic components in a control device according to an embodiment of the present invention.
Figure 20:
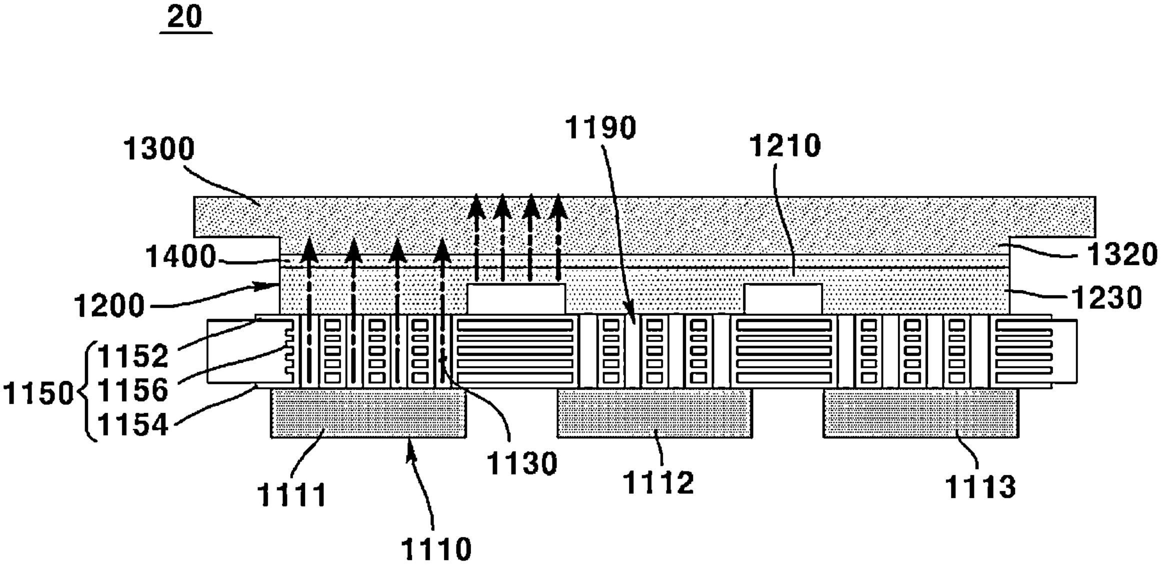
FIG. 20 is a diagram for explaining a heat dissipation structure inside a control device according to an embodiment of the present invention.

FIG. 13 is a perspective view of a control device according to an embodiment of the present invention; FIG. 14 is a perspective view illustrating a side surface of a heat dissipation structure in a control device according to an embodiment of the present invention; FIG. 15 is a plan view illustrating a terminal coupled to a printed circuit board according to an embodiment of the present invention; FIG. 16 is an exploded perspective view of a heat dissipation structure in a control device according to an embodiment of the present invention; FIG. 17 is a view illustrating FIG. 16 from another angle; FIG. 18 is a cross-sectional view of a control device according to an embodiment of the present invention; FIG. 19 is a diagram for explaining the connection structure of electronic components in a control device according to an embodiment of the present invention; and FIG. 20 is a diagram for explaining a heat dissipation structure inside a control device according to an embodiment of the present invention.

Referring to FIGS. 13 to 20, the control device 20 according to an embodiment of the present invention may comprise a printed circuit board 1100, an electronic component 1110, a terminal 1200, a cover 1300, and a filler 1400.

The printed circuit board 1100 may be formed in a plate shape. The printed circuit board 1100 may include one surface being coupled with the electronic component 1110, and another surface opposing the one surface being coupled with the terminal 1200. One or more elements for driving the control device 20 may be disposed on one surface or the other surface of the printed circuit board 1100. The printed circuit board 1100 may be disposed in a housing (not shown) that forms the outer shape of the control device 20.

The printed circuit board 1100 may include a plurality of holes 1130. The plurality of holes 1130 may be disposed to correspond to the arrangement area of the electronic component 1110. The plurality of holes 1130 may each be formed to penetrate from one surface of the printed circuit board 1100 to the other surface. The plurality of holes 1130 may be provided in plural numbers and disposed to be spaced apart from one another. Based on a single electronic component 1110, a plurality of holes 1130 may be formed in an area of the printed circuit board 1100 being coupled with the electronic component 1110. For example, as illustrated in FIG. 18, four holes 1130 may be disposed in the printed circuit board 1100 being coupled with a single electronic component 1110. The hole 1130 may also be referred to as a via hole.

The printed circuit board 1100 may include a metal layer 1150. The metal layer 1150 is connected to the electronic component 1110 or the terminal 1200, and may be a circuit pattern that electrically connects the printed circuit board 1100, the electronic component 1110, and the terminal 1200 to one another.

The metal layer 1150 may comprise: a first metal layer 1154 disposed on one side of the printed circuit board 1100; a second metal layer 1152 disposed on the other side of the printed circuit board 1100; a third metal layer 1156 connecting the first metal layer 1154 and the second metal layer 1152 and being disposed on the inner surface of the hole 1130. The metal layer 1150 may have a cross-sectional shape approximately in the shape of a letter "ㄷ" due to the first metal layer 1154, the second metal layer 1152, and the third metal layer 1156.

The first metal layer 1154 may be in contact with the electronic component 1110. The first metal layer 1154 may be electrically connected to the electronic component 1110.

The second metal layer 1152 may be in contact with the terminal 1200. The second metal layer 1152 may be electrically connected to the terminal 1200.

The third metal layer 1156 connects the first metal layer 1154 and the second metal layer 1152, and thus, the terminal 1200 and the electronic component 1110 can be electrically connected. The first metal layer 1154, the second metal layer 1152, and the third metal layer 1156 may be formed as one body.

The hole 1130 may be filled with a metal material 1190. The metal material 1190 may fill at least some among the plurality of holes 1130. The metal material 1190 may be a solder solution for soldering the electronic component 1110 or the terminal 1200 to the surface of the printed circuit board 1100. The metal material 1190 may be filled in the hole 1130 and connected to the metal layer 1150.

The electronic component 1110 may be disposed on one surface of the printed circuit board 1100. The electronic component 1110 may be coupled to the lower surface of the printed circuit board 1100. The electronic component 1110 may be soldered to the lower surface of the printed circuit board 1100. The electronic component 1110 may be coupled to the printed circuit board 1100 to face the hole 1130. The electronic component 1110 is connected to the metal layer 1150, so that the electronic components 1110 may be provided in plural numbers and disposed to be spaced apart from one another.

The electronic components 1110 may be provided in plural numbers and disposed to be spaced apart from one another. The electronic component 1110 may include an FET device. The electronic component 1110 may be referred to as a switching element. The electronic component 1110 may include a first switching element 1111, a second switching element 1112, and a third switching element 1113. The first to third switching elements 1111, 1112, and 1113 may be disposed to be spaced apart from one another. The first switching element 1111, the second switching element 1112, and the third switching element 1113 may each include a terminal being connected to the metal material 1190. For example, a first terminal is disposed on one surface of the first switching element 1111 facing the printed circuit board 1100, a second terminal is disposed on one surface of the second switching element 1112 facing the printed circuit board 1100, and a third terminal may be disposed on one surface of the third switching element 1113 facing the printed circuit board 1100. Each of the first to third terminals is in contact with the metal material 1190, so that the first to third switching elements 1111, 1112, and 1113 can be electrically connected to one another.

The printed circuit board 1100 may include a first path 2000 (refer to FIG. 19). The first path 2000 may electrically connect at least some of the plurality of electronic components 1110 to one another. The first path 2000 may be formed inside the printed circuit board 1100 to electrically connect the metal material 1190 or the metal layer 1150 filled in each of the plurality of holes 1130 to one another. Through the first path 2000, the first switching element 1111 and the second switching element 1112, the second switching element 1112 and the third switching element 1113, and the first switching element 1111 and the third switching element 1113 may be electrically connected to one another.

The control device 20 may include the terminal 1200. The terminal 1200 may be disposed on the other surface of the printed circuit board 1100. With respect to the printed circuit board 1100, the terminal 1200 may be disposed to face the electronic component 1110. With respect to the hole 1130, the electronic component 1110 may be disposed at one end of the hole 1130, and the terminal 1200 may be disposed at the other end of the hole 1130.

The terminal 1200 may electrically connect the plurality of electronic components 1110 to one another. The terminal 1200 may be made of a metal material.

The terminals 1200 may be provided in plural and disposed to be spaced apart from one another. Each of the plurality of terminals 1200 may be disposed to electrically connect the plurality of electronic components 110 to one another. For example, two terminals 1200 are provided and six electronic components 1110 are provided so that any one terminal electrically connects three electronic components 1110 to one another and the other terminal can electrically connect the remaining three electronic components 1110 to one another. In this case, the intensity of voltage or current flowing through each of the plurality of terminals 1200 may be different.

The terminal 1200 may include a body portion 1210 and a terminal portion 1230.

The body portion 1210 may be disposed to be spaced a predetermined distance from the other surface of the printed circuit board 1100. For example, as illustrated in FIG. 14, the lower surface of the body portion 1210 may be spaced apart from the upper surface of the printed circuit board 1100 by a predetermined distance. The body portion 1210 may be disposed in an area not being overlapped with the plurality of holes 1130.

The terminal portion 1230 is extended outward from the body portion 1210 and may be coupled to the other surface of the printed circuit board 1100. The terminal portion 1230 may have an area being bent at least once. The terminal portion 1230 may include: a first area 1232 being protruded downward from the side surface of the body portion 1210; and a second area 1234 being bent from an end of the first area 1232 being coupled to the other surface of the printed circuit board 100. The second area 1234 may be parallel to the body 1210, and the first area 1232 may be disposed perpendicular to the first area 1234 or the body 1210.

The terminal portion 1230 may be coupled to cover the plurality of holes 1130. The lower surface of the second area 1234 may be coupled to the upper portion of the plurality of holes 1130. One end of the plurality of holes 1130 may be covered through the second area 1234. The terminal portion 1230 may be in contact with the metal layer 1150 and the metal material 1190. The terminal portion 1230 may be soldered to the surface of the printed circuit board 1100. The lower surface of the second area 1234 may be soldered to the upper surface of the printed circuit board 1100.

With respect to the single body portion 1210, a plurality of terminal portions 1230 may be provided and disposed to be spaced apart from one another.

The terminal 1200 may include a second path 3000 electrically connecting at least some among the plurality of electronic components 1110. As previously described, the terminal 1200 may be connected to the plurality of holes 1130 through the terminal portion 1230. In this case, the terminal portion 1230 may be connected to the metal layer 1150 or the metal material 1190. Accordingly, the plurality of electronic components 1110 can be electrically connected to each other through the metal material 1190, one terminal portion of the plurality of terminal portions 1230, a second path 3000 being connected to the body portion 1210 and another terminal portion among the plurality of terminal portions 1230. Through the second pass 3000, the first switching element 1111 and the second switching element 1112, the second switching element 1112 and the third switching element 1113, and the first switching element 1111 and the third switching element 1113 can be electrically connected to one another.

Meanwhile, each of the plurality of terminals 1200 may additionally include a connection portion 1270 in addition to the terminal portion 1230. The connection portion 1270 is extended from the outside of the body portion 1210 to electrically connect the terminal 1200 and other components inside the printed circuit board 1100. For example, the connection portion 1270 may be electrically connected to another component in the printed circuit board 1100 or a power supply unit that provides power to the electronic component 1110. The connection portion 1270 also has an area being bent more than once, and may include a third area 1272 being extended from the body portion 1210 and a fourth area 1274 being bent from the third area 1272 and coupled to the other surface of the printed circuit board 1100.

The control device 20 may include the cover 1300. The cover 1300 may be disposed to cover the other surface of the printed circuit board 1100. The cover 1300 may be disposed outside the terminal 1200 with respect to the printed circuit board 1100. The cover 1300 may form the outer shape of the control device 20. In this case, the cover 1300 may also be referred to as a housing. The cover 1300 may be made of a metal material.

The cover 1300 may include a protrusion 320 being protruded inward. The protrusion 1320 may pressurize the upper surface of the body 1210. The protrusion 1320 may be in contact with the upper surface of the body portion 1210. The cross-sectional shape of the protrusion 1320 may be formed to correspond to the cross-sectional shape of the body portion 1210.

The control device 20 may include a filler 1400. The filler 1400 may be disposed between the cover 1300 and the terminal 1200. The filler 1400 may have one surface facing the upper surface of the body 1210 and the other surface facing the lower surface of the protrusion 1320. Both surfaces of the filler 1400 may be in contact with the cover 1300 and the terminal 1200, respectively. The filler 1400 may be a thermal filler made of a thermally conductive material. The filler 1400 may be formed of a plate material. The filler 1400 may be formed to correspond to the cross-sectional shape of the body portion 1210. An adhesive is disposed on the surface of the filler 1400 being in contact with the cover 1300 or the terminal 1200, so that it can be coupled to the cover 1300 or the terminal 1200, respectively.

According to the above structure, as illustrated in FIG. 20, heat generated from the electronic component 1110 may be sequentially conducted through the metal material 1190, the terminal 1200, the filler 1400, and the cover 1300 and be discharged to the outside. In this case, the heat dissipation path of the electronic component 1110 defined by the metal material 1190, the terminal 1200, the filler 1400, and the cover 1300 may be referred to as a first path.

Meanwhile, heat generated from the electronic component 1110 may be discharged to the outside at the highest rate through the first path. For example, more than 80% of the heat generated by the electronic component 1110 may be discharged to the outside through the first path.

According to the control device according to the present embodiment, by forming an additional connection path between the pluralities of electronic components 1110 through the terminal 1200, there is an advantage in that the amount of heat generated by the printed circuit board 1100 can be reduced due to a reduction in the resistance component of the electrical connection section.

In addition, since the heat of the electronic component 1110 is directly transferred to the terminal 1200, the filler 1400, and the cover 1300 through the metal material 1190 filled inside the hole 1130, there is an advantage that the heat dissipation area can be increased and heat dissipation efficiency can be enhanced.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A motor comprising:
a body;
a busbar coupled to the body; and
a heat transfer member disposed on the body,
wherein the body includes a first open area for exposing the busbar in an axial direction, and a second open area,
wherein the second open area includes a first unit open area and a second unit open area, and
wherein the heat transfer member is in contact with the busbar in the first open area and is disposed between the first unit open area and the second unit open area.

2. The motor according to claim 1,
wherein the heat transfer member is formed of a material different from the body.

3. The motor according to claim 1,
wherein a side wall is disposed between the first open area and the second open area.

4. The motor according to claim 3,
wherein a length of the side wall forming an inner surface of the first open area in a radial direction is greater than the length of the side wall in a radial direction forming an inner surface of the second open area.

5. The motor according to claim 1,
wherein a length of the first open area in a circumferential direction is smaller than a length of the second open area in a circumferential direction.

6. The motor according to claim 1,
wherein the busbar includes a busbar body extended in a circumferential direction and a protrusion extended in a radial direction from the busbar body,
wherein at least a portion of the busbar body is disposed in the first open area, and
wherein at least a portion of the protrusion is disposed in the second open area.

7. The motor according to claim 6, wherein the body includes a first body and a second body disposed on the first body,
wherein the busbar body is disposed on the second body, and
wherein a hole through which the protrusion passes is disposed on a side of the second body.

8. The motor according to claim 6, wherein the body includes a hole that overlaps the protrusion in a vertical direction, and
wherein the hole is disposed in the second open area.

9. The motor according to claim 6, comprising a terminal connected to one end of the busbar body and protruding onto the body.

10. The motor according to claim 6, wherein the busbar body includes a first area exposed to an outside of the body,
wherein the protrusion includes a second area exposed to the outside of the body, and
wherein the first area and the second area do not overlap each other based on a radial direction of the body.

11. The motor according to claim 1,
wherein a cross-sectional shape of the heat transfer member corresponds to a cross-sectional shape of the first open area.

12. The motor according to claim 1,
wherein the busbar includes a first busbar of a first polarity, a second busbar of a second polarity different from the first polarity, and a third busbar of a third polarity different from the first polarity and the second polarity, and
wherein the first to third busbars are disposed to be spaced apart from each other along a radial direction.

13. The motor according to claim 12, comprising an insulating member disposed between the first bus bar and the second bus bar and between the second bus bar and the third bus bar.

14. The motor according to claim 12, wherein the first bus bar includes a first protrusion disposed in the first unit open area, and
wherein the second bus bar includes a second protrusion disposed in the second unit open area.

15. The motor according to claim 14, wherein the first protrusion is disposed above the second protrusion.

16. A control device comprising:
a printed circuit board having first and second surfaces and including a plurality of holes;
a plurality of electronic components disposed on the plurality of holes on the first surface of the printed circuit board; and a terminal disposed on the second surface of the printed circuit board
wherein the printed circuit board includes a first path formed by a metal layer disposed in the printed circuit board and electrically connecting at least some of the plurality of electronic components to one another, and
wherein the terminal includes a second path formed by a terminal body and terminal portions connected to the plurality of holes, the second path electrically connecting at least some of the plurality of electronic components to one another.

17. The control device according to claim 16, wherein the terminal portions are arranged to cover the plurality of holes.

18. The control device according to claim 16, wherein the holes are filled with a metal material.

19. The control device according to claim 16, comprising a housing accommodating the printed circuit board,
wherein a protrusion that protrudes inward and presses the terminal is disposed on an inner surface of the housing.

20. The control device according to claim 16, wherein the terminal portions are bent from the terminal body and electrically connected to the metal layer through the plurality of holes.

* * * * *